(12) United States Patent
Archer et al.

(10) Patent No.: US 7,954,095 B2
(45) Date of Patent: May 31, 2011

(54) ANALYSIS AND SELECTION OF OPTIMAL FUNCTION IMPLEMENTATIONS IN MASSIVELY PARALLEL COMPUTER

(75) Inventors: Charles Jens Archer, Rochester, MN (US); Amanda Peters, Rochester, MN (US); Joseph D. Ratterman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 11/555,550

(22) Filed: Nov. 1, 2006

(65) Prior Publication Data

US 2008/0101232 A1    May 1, 2008

(51) Int. Cl.
G06F 9/44 (2006.01)
G06F 9/45 (2006.01)
G06F 15/00 (2006.01)
G06F 15/16 (2006.01)

(52) U.S. Cl. ........ 717/149; 717/127; 717/130; 717/151; 717/153; 712/200; 712/203; 709/201; 709/224; 709/248

(58) Field of Classification Search .................. None
See application file for complete search history.

(56) References Cited

U.S. PATENT DOCUMENTS

| | | | |
|---|---|---|---|
| 6,292,822 B1 * | 9/2001 | Hardwick | 718/105 |
| 6,330,008 B1 * | 12/2001 | Razdow et al. | 715/772 |
| 6,539,542 B1 * | 3/2003 | Cousins et al. | 717/151 |
| 7,093,234 B2 * | 8/2006 | Hibbeler et al. | 717/124 |
| 7,325,026 B1 * | 1/2008 | North, Jr. | 709/201 |
| 7,555,549 B1 * | 6/2009 | Campbell et al. | 709/224 |
| 7,555,566 B2 * | 6/2009 | Blumrich et al. | 709/249 |
| 2005/0071821 A1 * | 3/2005 | Levine et al. | 717/130 |
| 2005/0081104 A1 * | 4/2005 | Nikolik | 714/38 |
| 2007/0038987 A1 * | 2/2007 | Ohara et al. | 717/151 |
| 2007/0234294 A1 * | 10/2007 | Gooding | 717/124 |
| 2007/0294512 A1 * | 12/2007 | Crutchfield et al. | 712/200 |
| 2007/0294681 A1 * | 12/2007 | Tuck et al. | 717/149 |

OTHER PUBLICATIONS

Gara, A. et al., Overview of the Blue Gene/L system architecture, IBM J. Res. & Dev., vol. 49, No. 2/3, Mar./May 2005, pp. 195-212.
Adiga, N.R., et al., Blue Gene/L torus interconnection network, IBM J. Res. & Dev. vol. 49, No. 2/3 Mar./May 2005, pp. 265-276.
Almasi, G. et al. Design and implementation of message-passing services for the Blue Gene/L supercomputer, IBM J. Res. & Dev., vol. 49, No. 2/3, Mar./May 2005, pp. 393-406.
Aridor, Y. et al. Resource allocation and utilization in the Blue Gene/L supercomputer, IBM J. Res. & Dev., vol. 49, No. 2/3, Mar./May 2005, pp. 425-436.

* cited by examiner

Primary Examiner — Tuan Q Dam
Assistant Examiner — Isaac T Tecklu
(74) Attorney, Agent, or Firm — Wood, Herron & Evans, L.L.P.

(57) ABSTRACT

An apparatus, program product and method optimize the operation of a parallel computer system by, in part, collecting performance data for a set of implementations of a function capable of being executed on the parallel computer system based upon the execution of the set of implementations under varying input parameters in a plurality of input dimensions. The collected performance data may be used to generate selection program code that is configured to call selected implementations of the function in response to a call to the function under varying input parameters. The collected performance data may be used to perform more detailed analysis to ascertain the comparative performance of the set of implementations of the function under the varying input parameters.

23 Claims, 7 Drawing Sheets

ANALYSIS AND SELECTION OF OPTIMAL FUNCTION IMPLEMENTATIONS IN MASSIVELY PARALLEL COMPUTER

STATEMENT REGARDING FEDERALLY SPONSORED RESEARCH OR DEVELOPMENT

This invention was made with Government support under Contract No. B519700 awarded by the Department of Energy. The Government has certain rights in this invention.

FIELD OF THE INVENTION

The invention is generally directed to computers and computer software, and in particular, to the analysis and optimization of computer programs.

BACKGROUND OF THE INVENTION

Computer technology has continued to advance at a remarkable pace, with each subsequent generation of a computer system increasing in performance, functionality and storage capacity, and often at a reduced cost. A modern computer system typically comprises one or more central processing units (CPU) and supporting hardware necessary to store, retrieve and transfer information, such as communication buses and memory. A modern computer system also typically includes hardware necessary to communicate with the outside world, such as input/output controllers or storage controllers, and devices attached thereto such as keyboards, monitors, tape drives, disk drives, communication lines coupled to a network, etc.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using a parallel computer system incorporating multiple processors that operate in parallel with one another. The modest cost of individual processors packaged on integrated circuit chips has made this approach practical. Although the use of multiple processors creates additional complexity by introducing numerous architectural issues involving data coherency, conflicts for scarce resources, and so forth, it does provide the extra processing power needed to increase system throughput, given that individual processors can perform different tasks concurrently with one another.

Various types of multi-processor systems exist, but one such type of system is a massively parallel nodal system for computationally intensive applications. Such a system typically contains a large number of processing nodes, each node having its own processor or processors and local (nodal) memory, where the nodes are arranged in a regular matrix or lattice structure. The system contains a mechanism for communicating data among different nodes, a control mechanism for controlling the operation of the nodes, and an I/O mechanism for loading data into the nodes from one or more I/O devices and receiving output from the nodes to the I/O device(s). In general, each node acts as an independent computer system in that the addressable memory used by the processor is contained entirely within the processor's local node, and the processor has no capability to directly reference data addresses in other nodes. However, the control mechanism and I/O mechanism are shared by all the nodes.

A massively parallel nodal system such as described above is a general-purpose computer system in the sense that it is capable of executing general-purpose applications, but it is designed for optimum efficiency when executing computationally intensive applications, i.e., applications in which the proportion of computational processing relative to I/O processing is high. In such an application environment, each processing node can independently perform its own computationally intensive processing with minimal interference from the other nodes. In order to support computationally intensive processing applications which are processed by multiple nodes in cooperation, some form of inter-nodal data communication matrix is provided. This data communication matrix supports selective data communication paths in a manner likely to be useful for processing large processing applications in parallel, without providing a direct connection between any two arbitrary nodes. Optimally, I/O workload is relatively small, because the limited I/O resources would otherwise become a bottleneck to performance.

An exemplary massively parallel nodal system is the IBM Blue Gene®/L (BG/L) system. The BG/L system contains many (e.g., in the thousands) processing nodes, each having multiple processors and a common local (nodal) memory, and with five specialized networks interconnecting the nodes for different purposes. The processing nodes are arranged in a logical three-dimensional torus network having point-to-point data communication links between each node and its immediate neighbors in the network. Additionally, each node can be configured to operate either as a single node or multiple virtual nodes (one for each processor within the node), thus providing a fourth dimension of the logical network. A large processing application typically creates one ore more blocks of nodes, herein referred to as communicator sets, for performing specific sub-tasks during execution. The application may have an arbitrary number of such communicator sets, which may be created or dissolved at multiple points during application execution. The nodes of a communicator set typically comprise a rectangular parallelopiped of the three-dimensional torus network.

The hardware architecture supported by the BG/L system and other massively parallel computer systems provides a tremendous amount of potential computing power, e.g., petaflop or higher performance. Furthermore, the architectures of such systems are typically scalable for future increases in performance. However, unless the software applications running on the hardware architecture operate efficiently, the overall performance of such systems can suffer.

As an example, the BG/L system supports a message-passing programming library referred to as the Message Passing Interface (MPI). The selection of an appropriate network among the multiple networks supported in the BG/L system, as well as the appropriate communications algorithm, for each messaging primitive can have a significant effect on system and application performance. Consequently, in performance sensitive communications libraries like MPI, it is often the case that multiple internal implementations of the same external Application Programming Interface (API) function will exist, with each implementation differing from other implementations based upon the network and/or algorithm used. Typically, each implementation will have characteristics that make it them the fastest under some conditions, but not under other conditions, often based on the parameters passed to the function. For example, a simple point-to-point "send" may have two implementations: one for short messages designed to have low latency, and another for long messages designed to maximize bandwidth. This is frequently required because the positive aspects of low latency and high bandwidth tend to oppose each other.

In many instances, application developers will manually select specific implementations to call based upon the expected scenario under which those implementations will be used. In addition, in some instances a developer may hard code rules that select which implementation should be used in different circumstances. As a result, choices may be hard coded to some specific cut-off values, or the rules may be adjusted manually over time to attempt to find the fastest version. Neither of these solutions, however, will be able to reliably use the fastest implementation of a function on the first attempt to use the function, particularly when the precise environment within which a particular function may be called is not known beforehand.

It has been found, however, that the initial execution of an optimal implementation of an MPI function by an application can have a significant impact on the overall performance of a truly high performance parallel computing system. Furthermore, conventional solutions, which are essentially based upon hard coded rules established by a developer, have been found to lack the flexibility necessary to provide optimal selection of function implementations in different environments. In addition, it has been found that this same issue exists in connection with a wide variety of functions that may be implemented in a multitude of different ways. Therefore, a need exists for an improved manner of selecting from among multiple available implementations of a function to optimize the performance of applications running in a parallel computer system.

SUMMARY OF THE INVENTION

The invention addresses these and other problems associated with the prior art in providing an apparatus, program product and method that optimize the operation of a parallel computer system by, in part, collecting performance data for a set of implementations of a function capable of being executed on the parallel computer system based upon the execution of the set of implementations under varying input parameters in a plurality of input dimensions. By subjecting the implementations to varying input parameters in multiple input dimensions, the collected performance data is capable of being used to optimize the execution of a function in a wide variety of execution environments.

Consistent with one aspect of the invention, the collected performance data may be used to generate selection program code that is configured to call selected implementations of the function in response to a call to the function under varying input parameters. The selection program code may be used, for example, to route a function call to an appropriate implementation during runtime based upon one or more input parameters that characterize the environment under which the function has been called, and as a result, actual performance data may be used to optimize the performance of a function across a variety of input parameter combinations.

Consistent with another aspect of the invention, the generation of selection program code for a function may be performed in connection with the deployment of the function in a parallel computer system of the type including a plurality of interconnected nodes. The deployment may include generating the selection program code and deploying the implementations of the function and the selection program code to the parallel computer system.

Consistent with another aspect of the invention, the collected performance data may be used to perform apparatus analysis to ascertain the comparative performance of the set of implementations of the function under the varying input parameters. Collected performance data may be used, for example, to generate a multidimensional surface from which a plurality of transition points, or cut-off points, may be identified. The comparative performance data may also be used, for example, to detect algorithms that are not properly enabled, and/or to build a profile and extrapolate performance to larger systems. By doing so, developers may identify potential problems as well as potential areas upon which to focus refinements.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter collect performance data for a set of implementations of a function capable of being executed on the parallel computer system based upon the execution of the set of implementations under varying input parameters in a plurality of input dimensions. In this regard, a set of implementations may be considered to be a set of methods, functions, procedures, classes, modules, etc., that may all be called to perform the same basic function or task. Implementations may differ from one another based upon the methodology used to perform such a function or task, and some implementations will typically work better than other implementations when used with some sets of input parameters, but work worse than other implementations when used with other sets of input parameters.

To implement functional implementation selection, embodiments consistent with the invention typically rely on a set of cooperating applications that collectively manage the performance aspects of the varied implementations of one or more functions. One such application is a performance test application that runs on the system at issue to check each of the different implementations under varying input parameters and generate performance data for later processing.

In the illustrated embodiments, tests are performed, and data is collected, in a plurality of input dimensions, i.e., for a plurality of variables. For each input dimension, or variable, performance data is collected for a plurality of values of such dimension/variable. For example, separate input dimensions might be based upon the number of nodes along X, Y and Z dimensions in a three dimensional nodal network in a massively parallel computer system. For each such dimension, the number of nodes participating in an operation when a function is called may be varied, with performance data collected for each possible value (or at least a subset of values) of nodes in that dimension. Given the innumerable number of potential factors that may impact the performance of an implementation of a function in a complex computer system, it will be appreciated that the invention is not limited to any particular set of input dimensions as described herein. It will be appreciated, for example, that input dimensions and parameters may be associated with data specified in a function call, or data being otherwise operated upon and/or supplied in connection with the function call. In many instances, however, input dimensions and parameters are based upon any relevant conditions that characterize the runtime environment under which a particular function is called, either in addition to or in lieu of any dimensions or parameters that may be supplied by a user or program that is invoking the function call.

Another application that may be used in connection with functional implementation selection is a tool that is capable of parsing collected performance data to generate selection program code for incorporation into the program code for an application, library, or other component in a system to select an optimal implementation from among a set of implementations for a given set of input parameters whenever the function with which the set of implementations is association is requested. For example, the generation of selection program code may include the generation of C source code for re-insertion into a source tree for a high performance application executing on a massively parallel computer system to enable recent performance results to be taken into account when running the high performance application.

Yet another application that may be used in connection with functional implementation selection is a performance analysis tool that may be used to perform more detailed and in depth analysis of collected performance data. As will be discussed in greater detail below, an analysis tool may use collected performance data to generate a multidimensional surface such that a plurality of transition points in the multi-dimensional space can be identified and used to identify potential problems and/or further optimize selection program code. An analysis tool may also look for performance holes in an application such as regressions between drivers, algorithms that are not properly enabled, unexpected bandwidth or latency drop-offs, improper usage of a default implementation, performance bottlenecks, algorithms where results don't match known theoretical maximums, etc. An analysis tool may also be used to perform more advanced profiling of performance data based upon mathematical analysis.

Further details regarding the aforementioned applications will be described in greater detail below. Other modifications and enhancements to the embodiments described herein will also be apparent to one of ordinary skill in the art having the benefit of the instant disclosure.

Figure 1:
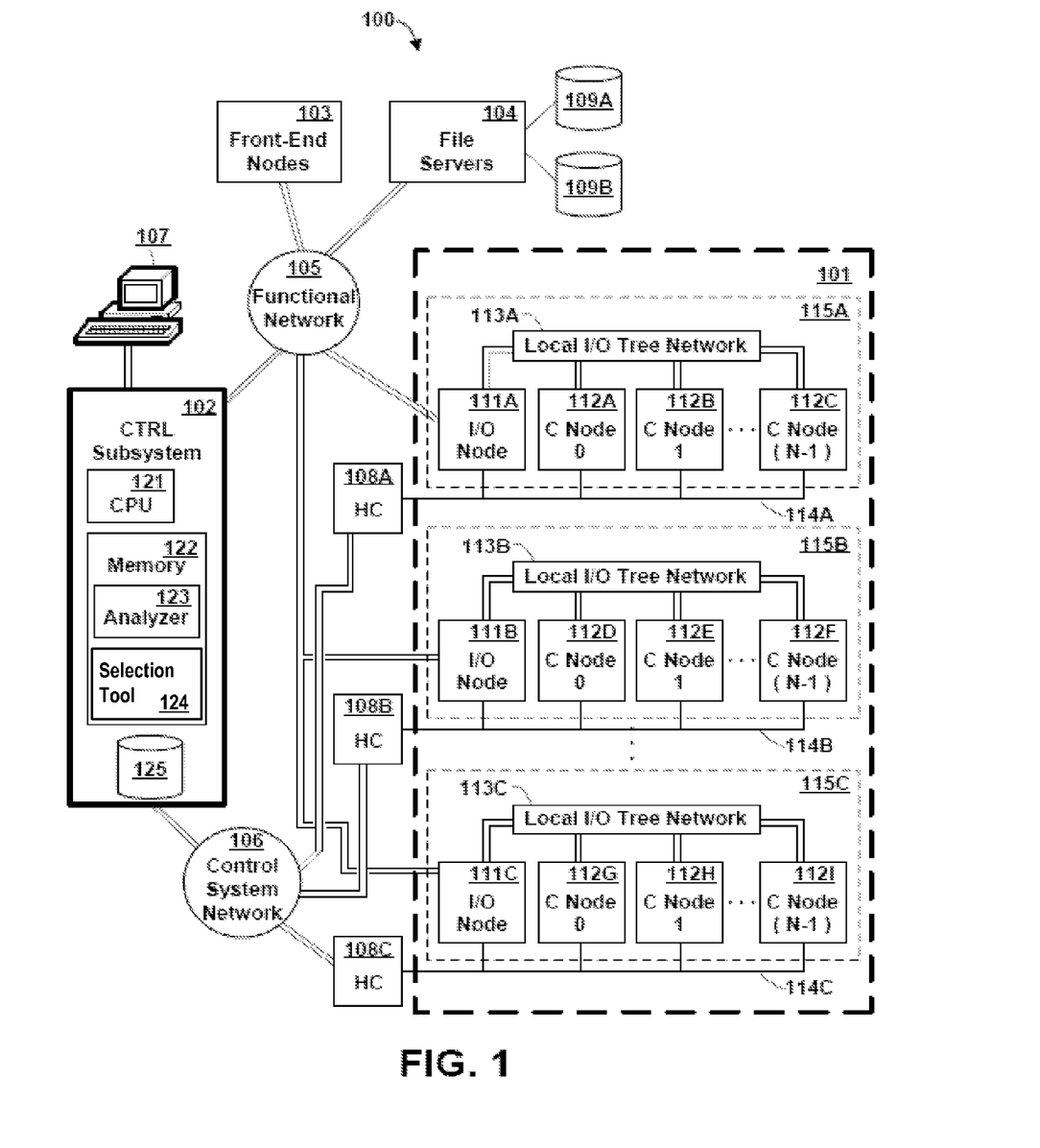
FIG. 1 is a high level block diagram of a massively parallel computer system incorporating functional implementation selection consistent with the invention.

Turning now to the Drawings, wherein like numbers denote like parts throughout the several views, FIG. 1 is a high-level block diagram of the major hardware components of an illustrative embodiment of a massively parallel computer system 100 consistent with the invention. In the illustrated embodiment, computer system 100 is an IBM Blue Gene®/L (BG/L) computer system, it being understood that other computer systems could be used, and the description of an illustrated embodiment herein is not intended to limit the present invention to the particular architecture described.

Computer system 100 includes a compute core 101 having a large number of compute nodes arranged in a regular array or matrix, which collectively perform the bulk of the useful work performed by system 100. The operation of computer system 100 including compute core 101 is generally controlled by control subsystem 102. Various additional processors included in front-end nodes 103 perform certain auxiliary data processing functions, and file servers 104 provide an interface to data storage devices such as rotating magnetic disk drives 109A, 109B or other I/O (not shown). Functional network 105 provides the primary data communications path among the compute core 101 and other system components. For example, data stored in storage devices attached to file servers 104 is loaded and stored to other system components through functional network 105.

Compute core 101 includes I/O nodes 111A-C (herein generically referred to as feature 111) and compute nodes 112A-I (herein generically referred to as feature 112). Compute nodes 112 are the workhorse of the massively parallel system 100, and are intended for executing compute-intensive applications which may require a large number of processes proceeding in parallel. I/O nodes 111 handle I/O operations on behalf of the compute nodes.

Each I/O node includes an I/O processor and I/O interface hardware for handling I/O operations for a respective set of N compute nodes 112, the I/O node and its respective set of N compute nodes being referred to as a Pset. Compute core 101 includes M Psets 115A-C (herein generically referred to as feature 115), each including a single I/O node 111 and N compute nodes 112, for a total of M×N compute nodes 112.

The product M×N can be very large. For example, in one implementation M=1024 (1K) and N=64, for a total of 64K compute nodes.

In general, application programming code and other data input required by the compute core for executing user application processes, as well as data output produced by the compute core as a result of executing user application processes, is communicated externally of the compute core over functional network 105. The compute nodes within a Pset 115 communicate with the corresponding I/O node over a corresponding local I/O tree network 113A-C (herein generically referred to as feature 113). The I/O nodes in turn are attached to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 may be implemented, for example, as mini-computer system including its own processor or processors 121 (of which one is shown in FIG. 1), internal memory 122, and local storage 125, and having an attached console 107 for interfacing with a system administrator. Control subsystem 102 includes an internal database which maintains certain state information for the compute nodes in core 101, and a control application executing on the control subsystem's processor(s) which controls the allocation of hardware in compute core 101, directs the pre-loading of data to the compute nodes, and performs certain diagnostic and maintenance functions. Control subsystem desirably includes an analytical program 123 for performing more detailed analysis of functional implementations, as well as a selection tool 124 for generating selection program code for use in optimizing the selection of function implementations, both operating in a manner described in greater detail below. Control system 102 communicates control and state information with the nodes of compute core 101 over control system network 106. Network 106 is coupled to a set of hardware controllers 108A-C (herein generically referred to as feature 108). Each hardware controller communicates with the nodes of a respective Pset 115 over a corresponding local hardware control network 114A-C (herein generically referred to as feature 114). The hardware controllers 108 and local hardware control networks 114 may be considered logically as extensions of control system network 106, although they are physically separate. The control system network and local hardware control network typically operate at a lower data rate than the functional network 105.

In addition to control subsystem 102, front-end nodes 103 each include a collection of processors and memory that perform certain auxiliary functions which, for reasons of efficiency or otherwise, are best performed outside the compute core. Functions that involve substantial I/O operations are generally performed in the front-end nodes. For example, interactive data input, application code editing, or other user interface functions are generally handled by front-end nodes 103, as is application code compilation. Front-end nodes 103 are coupled to functional network 105 for communication with file servers 104, and may include or be coupled to interactive workstations (not shown).

Figure 2:
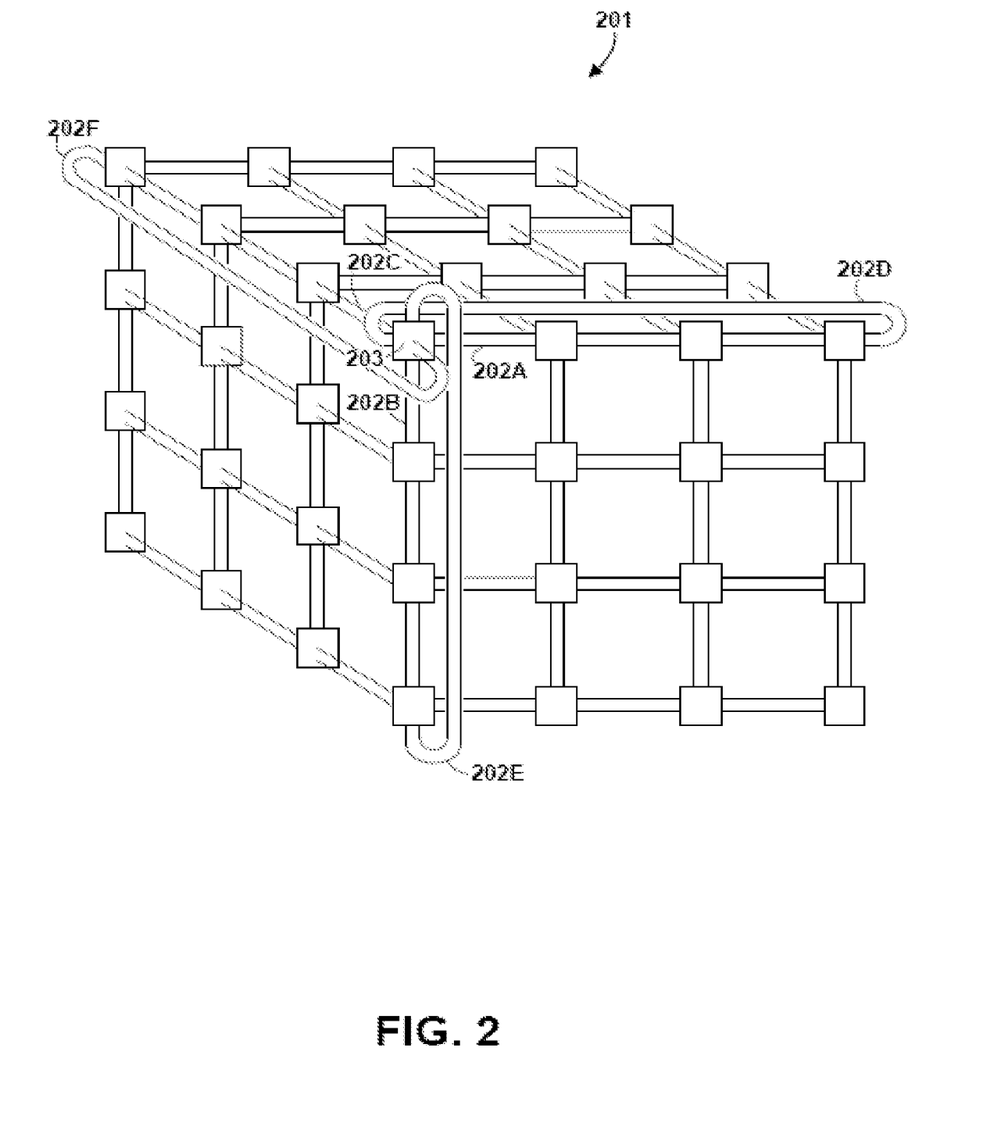
FIG. 2 is a simplified representation of a three dimensional lattice structure and inter-nodal communication network in the massively parallel computer system of FIG. 1.

Compute nodes 112 are logically arranged in a three-dimensional lattice, each compute node having a respective x, y and z coordinate. FIG. 2 is a simplified representation of the three dimensional lattice (also referred to as a mesh or torus) structure 201. Referring to FIG. 2, a simplified 4×4×4 lattice is shown, in which the interior nodes of the lattice are omitted for clarity of illustration. Although a 4×4×4 lattice (having 64 nodes) is represented in the simplified illustration of FIG. 2, it will be understood that the actual number of compute nodes in the lattice is typically much larger. Each compute node in lattice 201 includes a set of six node-to-node communication links 202A-F (herein referred to generically as feature 202) for communicating data with its six immediate neighbors in the x, y and z coordinate dimensions.

As used herein, the term "lattice" includes any regular pattern of nodes and inter-nodal data communications paths in more than one dimension, such that each node has a respective defined set of neighbors, and such that, for any given node, it is possible to algorithmically determine the set of neighbors of the given node from the known lattice structure and the location of the given node in the lattice. A "neighbor" of a given node is any node which is linked to the given node by a direct inter-nodal data communications path, i.e. a path which does not have to traverse another node. A "lattice" may be three-dimensional, as shown in FIG. 2, or may have more or fewer dimensions. The lattice structure is a logical one, based on inter-nodal communications paths. Obviously, in the physical world, it is impossible to create physical structures having more than three dimensions, but inter-nodal communications paths can be created in an arbitrary number of dimensions. It is not necessarily true that a given node's neighbors are physically the closest nodes to the given node, although it is generally desirable to arrange the nodes in such a manner, insofar as possible, as to provide physical proximity of neighbors.

In the illustrated embodiment, the node lattice logically wraps to form a torus in all three coordinate directions, and thus has no boundary nodes. E.g., if the node lattice contains dimx nodes in the x-coordinate dimension ranging from 0 to (dimx −1), then the neighbors of Node((dimx −1), y0, z0) include Node((dimx −2), y0, z0) and Node (0, y0, z0), and similarly for the y-coordinate and z-coordinate dimensions. This is represented in FIG. 2 by links 202D, 202E, 202F which wrap around from a last node in an x, y and z dimension, respectively to a first, so that node 203, although it appears to be at a "corner" of the lattice, has six node-to-node links 202A-F. It will be understood that, although this arrangement is an illustrated embodiment, a logical torus without boundary nodes is not necessarily a requirement of a lattice structure.

The aggregation of node-to-node communication links 202 is referred to herein as the torus network. The torus network permits each compute node to communicate results of data processing tasks to neighboring nodes for further processing in certain applications which successively process data in different nodes. However, it will be observed that the torus network includes only a limited number of links, and data flow is optimally supported when running generally parallel to the x, y or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes within any block may execute a common application code function or sequence.

Figure 3:
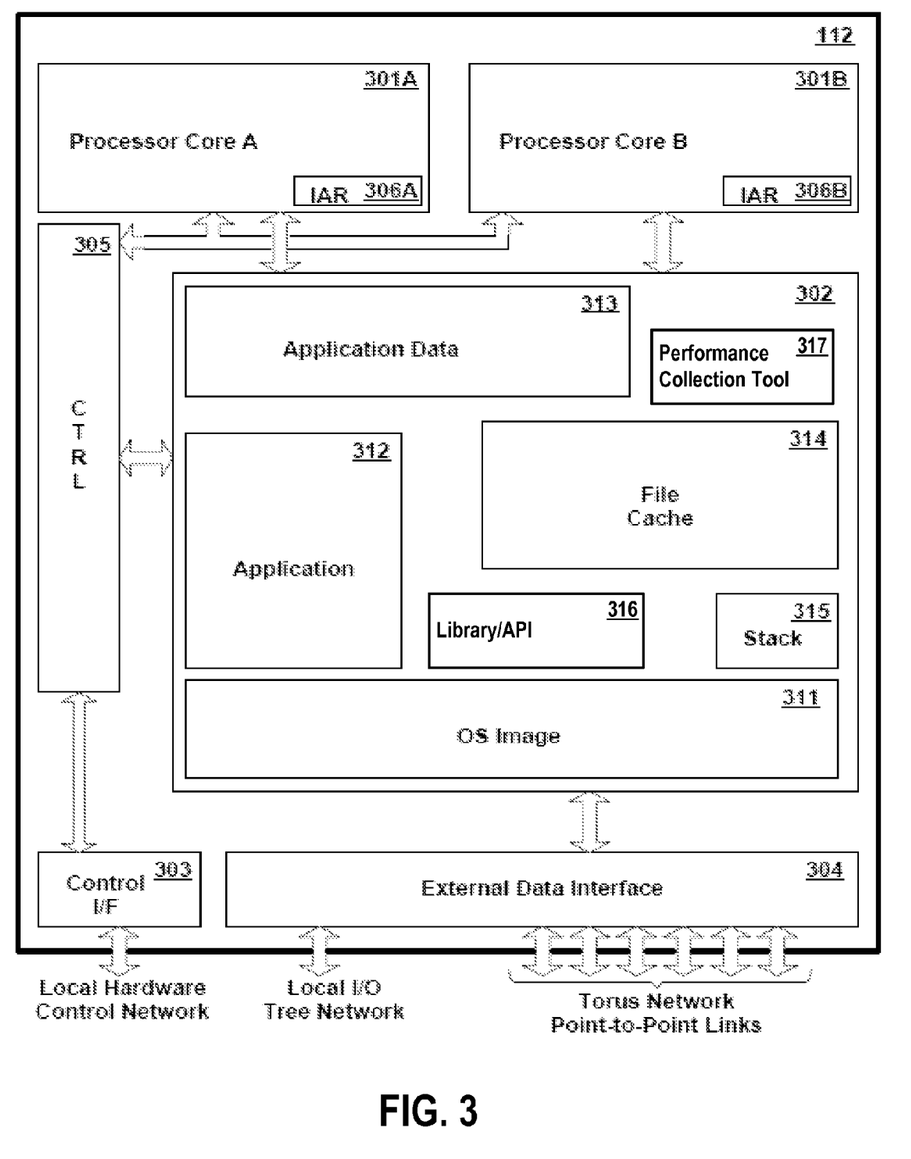
FIG. 3 is a high-level diagram of a compute node in the massively parallel computer system of FIG. 1.

FIG. 3 is a high-level block diagram of the major hardware and software components of a compute node 112 of computer system 100 configured in a coprocessor operating mode. It will be appreciated by one of ordinary skill in the art having the benefit of the instant disclosure that each compute node 112 may also be configurable to operate in a different mode, e.g., within a virtual node operating mode.

Compute node 112 includes one or more processor cores 301A, 301B (herein generically referred to as feature 301), two processor cores being present in the illustrated embodiment, it being understood that this number could vary. Compute node 112 further includes a single addressable nodal memory 302 that is used by both processor cores 301; an external control interface 303 that is coupled to the corresponding local hardware control network 114; an external data communications interface 304 that is coupled to the corresponding local I/O tree network 113, and the corresponding six node-to-node links 202 of the torus network; and monitoring and control logic 305 that receives and responds to control commands received through external control interface 303. Monitoring and control logic 305 can access certain registers in processor cores 301 and locations in nodal memory 302 on behalf of control subsystem 102 to read or alter the state of node 112. In the illustrated embodiment, each node 112 is physically implemented as a respective single, discrete integrated circuit chip.

From a hardware standpoint, each processor core 301 is an independent processing entity capable of maintaining state for and executing threads independently. Specifically, each processor core 301 includes its own instruction state register or instruction address register 306A, 306B (herein generically referred to as feature 306) which records a current instruction being executed, instruction sequencing logic, instruction decode logic, arithmetic logic unit or units, data registers, and various other components required for maintaining thread state and executing a thread.

Each compute node can operate in either coprocessor mode or virtual node mode, independently of the operating modes of the other compute nodes. When operating in coprocessor mode, the processor cores of a compute node do not execute independent threads. Processor Core A 301A acts as a primary processor for executing the user application sub-process assigned to its node, and instruction address register 306A will reflect the instruction state of that sub-process, while Processor Core B 301B acts as a secondary processor which handles certain operations (particularly communications related operations) on behalf of the primary processor. When operating in virtual node mode, each processor core executes its own user application sub-process independently and these instruction states are reflected in the two separate instruction address registers 306A, 306B, although these sub-processes may be, and usually are, separate sub-processes of a common user application. Because each node effectively functions as two virtual nodes, the two processor cores of the virtual node constitute a fourth dimension of the logical three-dimensional lattice 201. Put another way, to specify a particular virtual node (a particular processor core and its associated subdivision of local memory), it is necessary to specify an x, y and z coordinate of the node (three dimensions), plus a virtual node (either A or B) within the node (the fourth dimension).

As described, functional network 105 services many I/O nodes, and each I/O node is shared by multiple compute nodes. It should be apparent that the I/O resources of massively parallel system 100 are relatively sparse in comparison with its computing resources. Although it is a general purpose computing machine, it is designed for maximum efficiency in applications which are compute intensive. If system 100 executes many applications requiring large numbers of I/O operations, the I/O resources will become a bottleneck to performance.

In order to minimize I/O operations and inter-nodal communications, the compute nodes are designed to operate with relatively little paging activity from storage. To accomplish this, each compute node includes its own complete copy of an operating system (operating system image) in nodal memory 302, and a copy of the application code being executed by the processor core. Unlike conventional multi-tasking system, only one software user application sub-process is active at any given time. As a result, there is no need for a relatively large virtual memory space (or multiple virtual memory spaces) which is translated to the much smaller physical or real memory of the system's hardware. The physical size of nodal memory therefore limits the address space of the processor core.

As shown in FIG. 3, when executing in coprocessor mode, the entire nodal memory 302 is available to the single software application being executed. The nodal memory contains an operating system image 311, an application code image 312, and user application data structures 313 as required. Some portion of nodal memory 302 may further be allocated as a file cache 314, i.e., a cache of data read from or to be written to an I/O file.

Operating system image 311 contains a complete copy of a simplified-function operating system. Operating system image 311 includes certain state data for maintaining process state. Operating system image 311 is desirably reduced to the minimal number of functions required to support operation of the compute node. Operating system image 311 does not need, and desirably does not include, certain of the functions normally included in a multi-tasking operating system for a general purpose computer system. For example, a typical multi-tasking operating system may include functions to support multi-tasking, different I/O devices, error diagnostics and recovery, etc. Multi-tasking support is typically unnecessary because a compute node supports only a single task at a given time; many I/O functions are not required because they are handled by the I/O nodes 111; many error diagnostic and recovery functions are not required because that is handled by control subsystem 102 or front-end nodes 103, and so forth. In the illustrated embodiment, operating system image 311 includes a simplified version of the Linux operating system, it being understood that other operating systems may be used, and further understood that it is not necessary that all nodes employ the same operating system.

Application code image 312 is desirably a copy of the application code being executed by compute node 112. Application code image 312 may include a complete copy of a computer program that is being executed by system 100, but where the program is very large and complex, it may be subdivided into portions that are executed by different respective compute nodes. Memory 302 further includes a call-return stack 315 for storing the states of procedures that must be returned to, which is shown separate from application code image 312, although it may be considered part of application code state data.

In addition, memory 302 typically includes one or more libraries, or Application Programming Interfaces (API's), such as library 316. Each library 316 provides a set of functions made available to application 312, and in some embodiments, each library 316 may be included within operating system image 311. As will become more apparent below, library 316 may also include multiple implementations of one or more of the supported functions, with each such implementation operating better or worse than other implementations depending upon various aspects of a current operating environment.

To implement functional implementation selection consistent with the invention, the performance of one or more implementations defined in library 316 is monitored by a performance collection tool 317 resident in memory 302.

Tool 317 collects performance data associated with the execution of different implementations of one or more functions in library 316, and it is this data that is used by the analysis and selection tools 123, 124 in determining optimal selection of function implementations.

It will be appreciated that, when executing in a virtual node mode (not shown), nodal memory 302 is subdivided into a respective separate, discrete memory subdivision, each including its own operating system image, application code image, application data structures, and call-return stacks required to support the user application sub-process being executed by the associated processor core. Since each node executes independently, and in virtual node mode, each processor core has its own nodal memory subdivision maintaining an independent state, and the application code images within the same node may be different from one another, not only in state data but in the executable code contained therein. Typically, in a massively parallel system, blocks of compute nodes are assigned to work on different user applications or different portions of a user application, and within a block all the compute nodes might be executing sub-processes which use a common application code instruction sequence. However, it is possible for every compute node 111 in system 100 to be executing the same instruction sequence, or for every compute node to be executing a different respective sequence using a different respective application code image.

In either coprocessor or virtual node operating mode, the entire addressable memory of each processor core 301 is typically included in the local nodal memory 302. Unlike certain computer architectures such as so-called non-uniform memory access (NUMA) systems, there is no global address space among the different compute nodes, and no capability of a processor in one node to address a location in another node. When operating in coprocessor mode, the entire nodal memory 302 is accessible by each processor core 301 in the compute node. When operating in virtual node mode, a single compute node acts as two "virtual" nodes. This means that a processor core 301 may only access memory locations in its own discrete memory subdivision.

While a system having certain types of nodes and certain inter-nodal communications structures is shown in FIGS. 1 and 2, and a typical node having two processor cores and various other structures is shown in FIG. 3, it should be understood that FIGS. 1-3 are intended only as a simplified example of one possible configuration of a massively parallel system for illustrative purposes, that the number and types of possible devices in such a configuration may vary, and that the system often includes additional devices not shown. In particular, the number of dimensions in a logical matrix or lattice might vary; and a system might be designed having only a single processor for each node, with a number of processors greater than two, and/or without any capability to switch between a coprocessor mode and a virtual node mode. While various system components have been described and shown at a high level, it should be understood that a typical computer system includes many other components not shown, which are not essential to an understanding of the present invention. Furthermore, various software entities are represented conceptually in FIGS. 1 and 3 as blocks or blocks within blocks of local memories 122 or 302. However, it will be understood that this representation is for illustrative purposes only, and that particular modules or data entities could be separate entities, or part of a common module or package of modules, and need not occupy contiguous addresses in local memory. Furthermore, although a certain number and type of software entities are shown in the conceptual representations of FIGS. 1 and 3, it will be understood that the actual number of such entities may vary and in particular, that in a complex computer system environment, the number and complexity of such entities is typically much larger.

It will also be appreciated that, while the illustrated embodiment utilizes a massively parallel computer system, the principles of the invention may be applied to other types of parallel, or multi-processor computer systems, whether implemented as multi-user or single-user computers, or in various other programmable electronic devices such as hand-held computers, set top boxes, mobile phones, etc.

The discussion hereinafter will focus on the specific routines utilized to implement the aforementioned functionality. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Furthermore, it will be appreciated that the routines described herein may also be utilized in the deployment of services. In particular, program code that has been generated by the herein described techniques may be deployed to a parallel computer system, e.g., a massively parallel computer system, along with the various implementations of the function for which the program code has been generated. Such deployment may include manual or automated transmission of the program code to an operational computer system, and/or the manual or automated installation of such program code in an operational computer system.

Those skilled in the art will recognize that the exemplary environment illustrated in FIGS. 1-3 is not intended to limit the present invention. Indeed, those skilled in the art will recognize that other alternative hardware and/or software environments may be used without departing from the scope of the invention.

Figure 4:
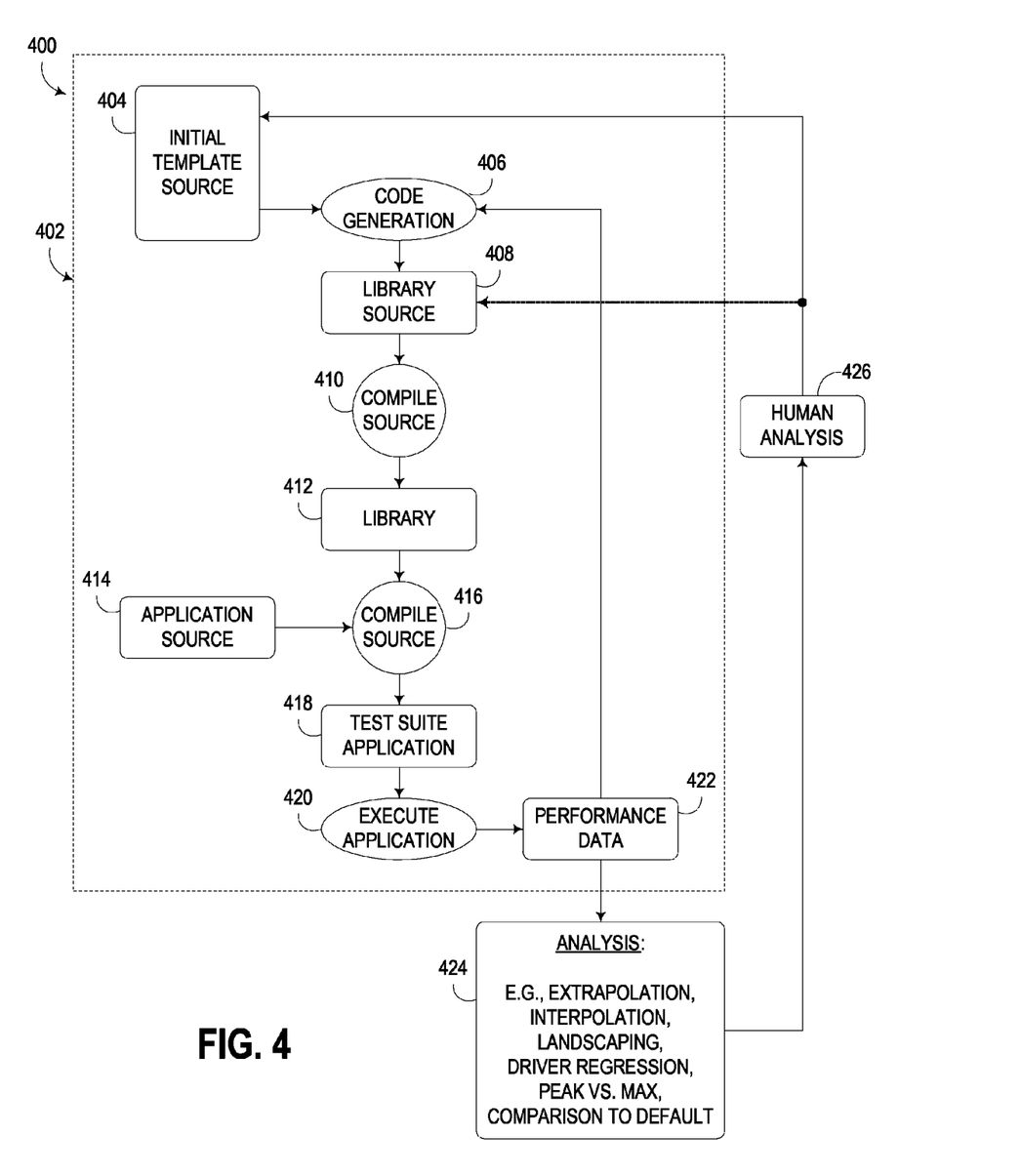
FIG. 4 is a flowchart illustrating an exemplary process for performing functional implementation selection in the massively parallel computer system of FIG. 1.

Now turning to FIG. 4, an overall process for performing function implementation selection consistent with the invention is illustrated at 400. In this process, it is assumed that a function having more than one implementation is to be provided within a library to be used in a massively parallel computer system, e.g., a communications library providing one or more messaging passing functions, or API's.

The process for the automated generation of selection program code, in particular, is illustrated within block 402, and begins with an initial template source 404, which represents a source code version a "best guess" or default implementation selection program code for one or more functions in a library. A code generation block 406 takes the initial template source 404 and inserts the source code into the library source code 408. On the initial pass, when no performance data is available, code generation block 406 simply inserts the initial template source 404 into library source code 408. The library source code 408, with embedded selection program code, is then compiled in block 410 to generate an executable library 412.

Application source code 414, which in this instance is a test suite application used to test the library and collect performance data, e.g., by running each implementation of the function under different input parameters that vary in a plurality of dimensions, is then compiled in block 416 to generate a test suite application 418. During compilation in block 416, library 412 is linked or otherwise attached to the test suite application in a conventional manner. Test suite application 418 is then executed in block 420, which results in the generation of performance data 422.

Desirably, the test suite application is configured to run a set of performance tests for each collective in each dimension in order to gather enough performance data for analysis and optimal selection. For example, in an exemplary communications library, functions such as AllGather, AllGatherv, AllReduce, Barrier, Broadcast, and Reduce may have multiple implementations and may be optimized in the manner described herein. In the illustrated embodiment, for example, each of these functions may be tested in several dimensions, for example based upon underlying algorithm, message size, network affinity, CPU mode (i.e. virtual node and coprocessor modes), lattice/torus size, etc. For some collectives, e.g., reduction methods, the data type and operation may play a significant role and may be included in the tested dimensions.

A test suite application consistent with the invention may run tests on collectives on systems of varying size and shape, and as a result, a test suite application may dynamically reconfigure a system to run different tests. On a BG/L system, for example, the system partitions on which jobs are run have sizes in three dimensions, X, Y, and Z, and these dimensions may be varied during the tests. Alternatively, performance data may be generated on multiple physical systems of differing characteristics, and the data from all of the systems may be collected for selection code generation and other analysis.

In addition, in some embodiments, tests may be run on representatively sized blocks and used to extrapolate to larger blocks, which often allows savings of time and hardware. The data may also be interpolated to generate a smooth multidimensional surface, as will be discussed in greater detail below. Such extrapolation and/or interpolation may be used to predict performance results for data not explicitly tested.

The configuration of a test suite application to collect performance data for a library function will of course vary substantially based upon the type of computer system involved, the type of function, and the types of implementations of that function, among other factors. As such, the invention is not limited to any particular performance data collection algorithm disclosed herein. It will also be appreciated that the generation of a test suite application to adequately test a particular library function within a particular computer system would be well within the abilities of one of ordinary skill in the art having the benefit of the instant disclosure.

Once the performance data has been generated, the performance data may then be fed back into code generation block 406 to generate selection program code based upon the performance data, such that the selection program code selects the optimal implementation of a function based upon different input parameters. The generated selection code is then inserted into a source tree, e.g., into library source 408, which is once again compiled in block 410 to generate an executable library 412. Once library 412 has been generated, the library can be retested by linking the library to the test suite application and generating new performance data, or alternatively, library 412, now optimized, may simply be installed in the massively parallel computer system for access by other applications.

Figure 5:
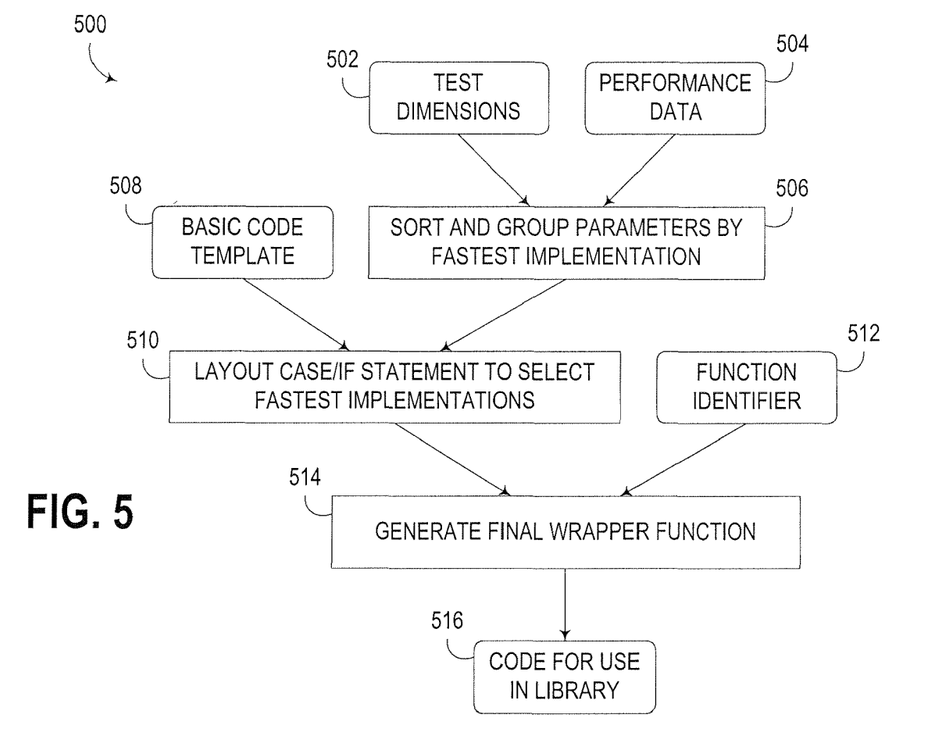
FIG. 5 is a flowchart illustrating an exemplary process for generating selection program code in the massively parallel computer system of FIG. 1.

FIG. 5 illustrates one implementation of a code generation process 500 consistent with the invention, and suitable for use in block 406 of FIG. 4. Process 500 begins by taking test dimensions 502 and collected performance data 504 and sorting and grouping test parameters by fastest implementation, as shown in block 506. Test dimensions 502 represent the dimensions, or variables, under which the function implementations have been tested, while performance data 504 represents the performance of each implementation at each parameter, or value, in each such dimension. The result of block 506 is therefore sorted and grouped lists of implementations for various parameters in various dimensions. It will be appreciated that the lists generated in block 506 may be concatenated in some instances, e.g., so that only the top x implementations will be listed for a given tested parameter. Furthermore, block 506 may also identify only those parameters and/or dimensions that operate as transition points where one implementation becomes optimal over other implementations. These transition points may then be used to identify appropriate conditions that may be inserted into the selection program code to select between optimal implementations. For example, if implementation A of a certain function is found to be optimal for values 1, 2, 3, and 4 of a parameter X, while another implementation B of that function is found to be optimal for values of that parameter above 4, the test parameters for X=1-4 may be grouped, as may the test parameters for X>5. An appropriate condition for selecting between implementations A and B would then be based upon the condition of whether X>5.

As one example, block 506 may be implemented in an exemplary embodiment so as to designate each combination of test parameters as a point in a "test space." For each point in this test space, the tested implementations may be sorted by performance, tracking any restrictions that exist for using particular implementations or algorithms (e.g. max payload size, specific network system, etc.). Based upon the gathered information, a list may then be created for use at run time to select the highest performing implementation that meets the present restrictions. It is possible to trim the list in the cases where an implementation with some set of specific restrictions is slower then a more general implementation. In these cases, the restrictive implementation typically need not be considered.

In the exemplary embodiment, transition points may then be identified in each sortable/numeric axis in the test space, with the transition points being defined as when the lists associated with two adjacent points are not the same, indicating that performance characteristics of the two points differ and should be reflected when considering the correct implementation to use. In such instances, generating comparative IF statements often will adequately address the selection of an appropriate implementation. For non-numeric dimensions, switch statements may instead be generated so that, when running, the match system can quickly select the matching transition point in the space for comparison.

The lists generated by block 506 are then provided along with a basic code template 508 to block 510 to layout selection program code to select the fastest implementation for one or more sets of input parameters in one or more dimensions. Code template 508 may include suitable source code for selecting from one or more implementations based upon one or more input parameters, and may include one or more IF statements, case/switch statements, or other conditional statements suitable for use in the appropriate programming language. In some embodiments, for example, a hash table may be used to select a particular implementation based upon a hash of the set of input parameters associated with a given function call, and as such, a code template may include the framework of a hash table.

The layout of the program code to select the fastest implementation for different sets of input parameters in block 510 typically incorporates the insertion of conditional statements into the code template to effect the desired selection of implementations based upon input parameters. The conditional statements may be nested as desired, and in general may use any appropriate framework suitable for selecting the optimal implementation for a given set of input parameters. In addition, if a hash function is used to select implementations, a suitable hash function may be generated in block 510 and inserted into the code template, in a manner that will be apparent to one of ordinary skill in the art having the benefit of the instant disclosure.

The output of block 510 is then provided along with a function identifier 512 to block 514 to generate the final wrapper function, resulting in the output of selection program code 516 that is suitable for use in the library. The function identifier and the final wrapper function typically constitute the call signature of the function, including any input parameters required to be provided to the function. The resulting code thus provides a single interface to the function, but with the inserted selection program code used to invoke the optimal internal implementation of the function in response to a function call.

Table I below illustrates a portion of a pseudocode representation of exemplary selection program code that may be used to select from among multiple implementations of a particular function in computer system 100 of FIG. 1. In this code, it is assumed that four suitable implementations of the function exist, including two default implementations, designated as impl_default, impl_default2, and two additional implementations, designated as impl_net_1 and impl_net_2 that are specifically configured to respectively use the collective (net_1) and torus (net_2) networks to implement the function. One input dimension for the selection program code is the node mode ("mode") representing whether the node upon which the function is being called is running in virtual node mode ("mode_option_1") or coprocessor mode (not shown in the table). Another input dimension is based upon the number of nodes in the system ("nodes"), with transition points defined at 1024 and 2048 nodes. Another input dimension is based upon the message size for the function, with transition points defined at 64 and 8192 when the number of nodes is less than 1024, and at 64, 256, 512, 2048 and 4096 if the number of nodes is greater than or equal to 1024 and less than 2048. Other input dimensions are based upon the availability, or active status, of the collective (net_1) and torus (net_2) networks. As may be seen from the table, three of the implementations, impl_net_1, impl_net_2 and impl_default2 are invoked whenever the set of input parameters match the conditions associated with such implementations. When the set of input parameters does not match any of the conditions associated with such implementations, the selection program code defaults to the default implementation impl_default.

TABLE I

Exemplary Pseudocode

```
switch (mode)
{
  case (mode_option_1):
    if (nodes < 1024) {
    /* Based on data from 512 nodes: */
      if (msize <= 64)
      {
        if (net_1) return impl_net_1 (options);
        /*default*/return impl_default (options);
      }
      if (msize <= 8192)
      {
        if (net_1) return impl_net_1 (options);
        /*default*/return impl_default2(options);
      }
      if (net_1) return impl_net_1 (options);
      if (net_2) return impl_net_2 (options);
      /*default*/return impl_default2(options);
    }
    if (nodes < 2048) {
    /* Based on data from 1024 nodes: */
      if (msize <= 64)
      {
        if (net_1) return impl_net_1 (options);
        /*default*/return impl_default (options);
      }
      if (msize <= 256)
      {
        if (net_1) return impl_net_1 (options);
        /*default*/return impl_default2(options);
      }
      if (msize <= 512)
      {
        if (net_1) return impl_net_1 (options);
        /*default*/return impl_default (options);
      }
      if (msize <= 2048)
      {
        if (net_1) return impl_net_1 (options);
        /*default*/return impl_default2(options);
      }
      if (msize <= 4096)
      {
        if (net_1) return impl_net_1 (options);
        if (net_2) return impl_net_2 (options);
        /*default*/return impl_default2(options);
      }
      if (net_1) return impl_net_1 (options);
      if (net_2) return impl_net_2 (options);
      /*default*/return impl_default (options);
    }
    break;
  ....
}
/*default*/return impl_default (options);
```

As noted above, this source code may be inserted into a source tree and recompiled, ensuring the latest performance results are taken into account when running high performance applications. In this manner, a developer does not need to know which implementation will be fastest when they write software that uses the library, but they can simply can a generic function and be assured of getting the optimal implementation of that function.

Returning to FIG. 4, performance data 422 may also be used by the aforementioned performance analysis tool to perform more detailed analysis of the performance characteristics of different implementations of a function, and to potentially provide additional opportunities for performance optimization.

As shown in block 424, detailed analysis may be performed on the performance data, including operations such as extrapolating and/or interpolating data, landscaping data to generate one or more multidimensional surfaces, performing driver regression, performing peak vs. max performance analysis, performing comparative analysis to default performance, etc. Such analysis may be computer automated, as illustrated in block 424 and/or human analysis may also be performed, as shown in block 426. Such data may be used, for example, to potentially revise the initial template source 404, or to modify the library source 408, e.g., to modify or rewrite certain implementations of a function, eliminate certain implementations, add new implementations, etc. Such operations may be manually implemented by a developer and/or through automated code generation, as appropriate.

Figure 6:
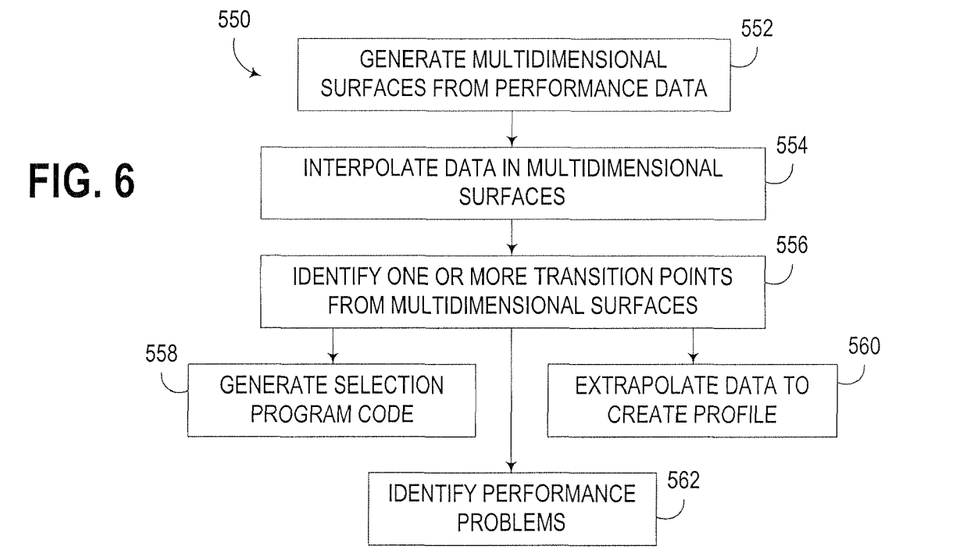
FIG. 6 is a flowchart illustrating an exemplary process for analyzing performance data in the massively parallel computer system of FIG. 1.

FIG. 6, for example, illustrates at 550 a process that may be utilized by an analysis tool consistent with the invention. Process 550 begins in block 552 by generating one or more multidimensional surfaces from the performance data, in the general manner described above. Next, as shown in block 554, the data in the multidimensional surfaces may optionally be interpolated to "fill out" the surfaces and smooth any curves based upon the potentially sparse data points generated from the collected performance data. Next, as shown in block 556, one or more transition points may be identified from the multidimensional surfaces. Then, as shown in blocks 558-562, various operations maybe performed on the generated data, either by an analysis tool, by a developer, and/or by a separate program. For example, as shown in block 558, selection program code for the function may be generated, in much the same manner as described above. Also, as shown in block 560, the data in the multidimensional surfaces may be extrapolated to generate a more generalized profile (discussed in greater detail below).

In addition, as shown in block 562, analysis may be performed in part by an analysis tool that consumes the same performance data to aid developers searching for potential problems and/or to identify possible performance enhancements. An analysis tool consistent with the invention, for example, may check for regressions between drivers, isolate algorithms (implementations) that are not properly enabled, and ensure that correct implementations are being utilized. An analysis tool may also be used to identify sets of input parameters resulting in sub-optimal performance. It is believed, for example, that if a test space is sufficiently large, developers integrating new approaches may overlook performance impacts in some areas. By algorithmically searching for such problems and alerting developers if any are found, developers may be these can be fixed quickly.

Checking for regressions between drivers may include, for example, comparing relative performances of different releases of a driver at different test points to ensure there are no significant drop-offs in performance. Detecting implementations that are not properly enabled may include, for example, comparing maximum theoretical bandwidth versus peak achieved, or searching for unexpected bandwidth or latency drop-offs. In addition, improperly enabled implementations may be detected by comparing performance results of different implementations to a default implementation, which may additionally indicate that a default implementation is being incorrectly used. In addition, analysis may be performed to compare the performance of smaller collective systems to see where one code base might have an accidental bottleneck. An analysis tool consistent with the invention may be used to flag any performance issues based upon any of the analysis techniques discussed above.

As noted above in connection with block 560, an analysis tool may also be used to perform more advanced analysis, e.g., to generate landscapes or profiles. Performance data may be used, for example, to create a landscape, or multidimensional surface, that accurately depicts the performance characteristics of a function being tested. The full data set for the landscape can be created, for example, by running the test suite application discussed above in connection with FIG. 4 and altering the size and shape of the system. For example, by growing the X, Y, and Z dimensions of a test system independently, enough data may be collected to enable a multidimensional representation of the system performance. An example of the performance data generated can be seen in FIGS. 7-9.

Figure 7:
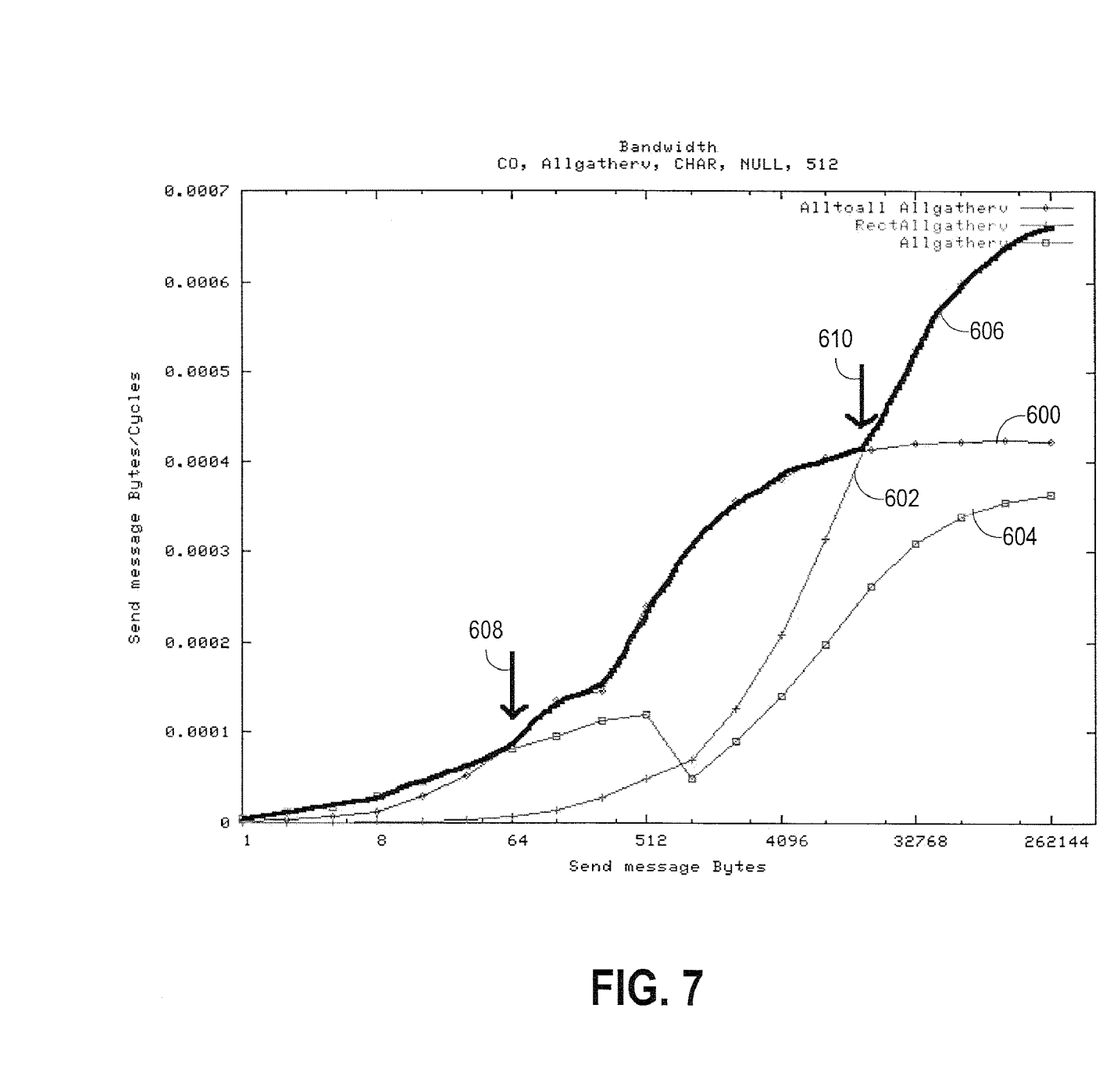
FIG. 7 is a graph of a two dimensional landscape for exemplary performance data as may be collected by the process of FIG. 4, illustrating the selection of cutoff points from which to switch between different implementations of a function based upon input parameters thereto.

As shown in FIG. 7, for example, a 2D primitive may be generated for each of a plurality of implementations of an Allgather function, which is typically used to distribute node numbers to a set of nodes in a massively parallel computer system to enable all of the nodes participating in a particular operation to retain copies of the node numbers for all of the other nodes involved in the operation. Each 2D primitive includes message size on the independent x axis, and the bandwidth (in bytes/cycle) on the dependent y axis. The implementation/algorithm forms a series in the z axis.

One implementation, shown on the graph at 600 and identified as "Alltoall Allgatherv," uses an all-to-all algorithm that is well optimized to quickly distribute data on smaller systems. Another implementation, shown on the graph at 602 and identified as "Rect Allgatherv," uses a special broadcast algorithm that is optimized for use when communicating nodes are arranged in a rectangular arrangement in the lattice. Yet another implementation, shown on the graph at 604 and identified as "Allgatherv," is a default implementation that is general enough to work in all cases, albeit somewhat slower than others.

As may be seen from the figure, the best performance below 64 bytes occurs using the default "Allgatherv" implementation. Between 64 and 16384 bytes, the optimal performance occurs using the "Alltoall Allgatherv" implementation, while above 16384 bytes, the optimal performance occurs using the "Rect Allgatherv" implementation. The overall optimal implementation curve or profile is shown at 606, and includes cutoff, or transition, points 608, 610 that indicate points at which the implementation used to perform a called function should be switched. It also should be noted that these profiling points are sparse, and do not contain all points on the graph. Interpolation may thus be used to select the appropriate collective between data points.

Figure 8:
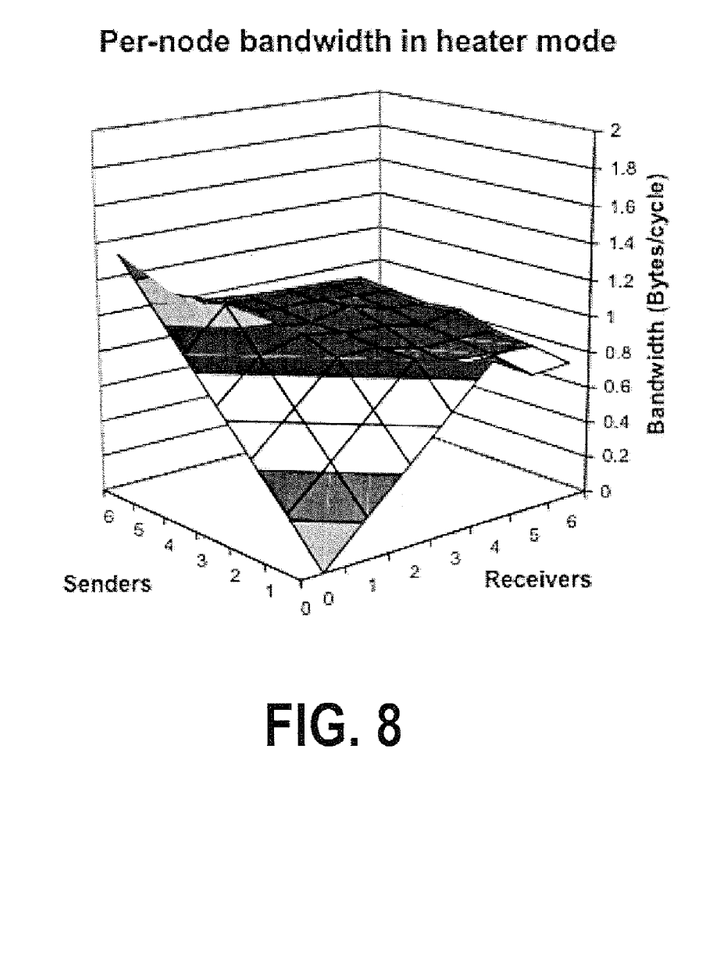
FIGS. 8 and 9 are graphs of three dimensional landscapes for exemplary performance data as may be collected by the process of FIG. 4.
Figure 9:
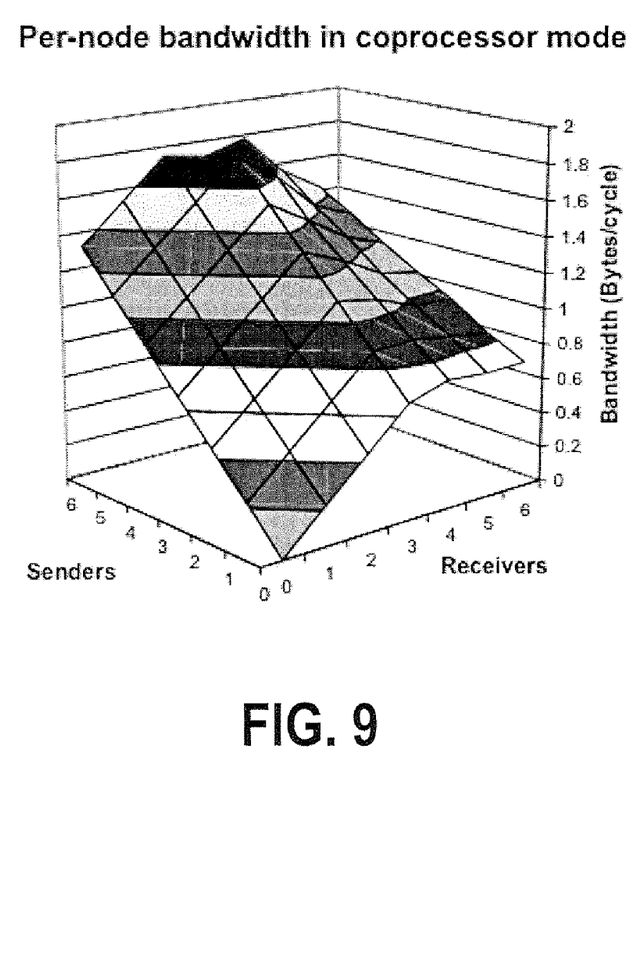

The graph of FIG. 7 represents a 2D landscape, but nothing prevents the code from generating a multi-dimensional surface based on any performance parameters. For example, in one exemplary implementation, the point to point bandwidth for 6 directional sends may be optimized using 3 axis (bandwidth, number of senders, number of receivers), as shown in FIGS. 8 and 9. FIG. 8, in particular charts the per node bandwidth for a function when a node is in a "heater" mode— typically a mode in which only one of the cores in a processor chip is active. FIG. 9 charts the same bandwidth parameter for a function when a node is in a "coprocessor" mode, where both cores in a processor chip are active, but with one core assisting the other core in its operation.

It will be appreciated that by superimposing the graphs of FIGS. 8 and 9, a profile may be created for six directional sends that includes the better latency typically found in heater mode and the better bandwidth typically found in coprocessor mode. Such a profile may then be used to generate appropriate selection program code to provide optimal execution of the function under varying input parameters. It will of course be appreciated that the number and types of dimensions in a profile may vary substantially in different embodiments.

A profile, in this context, is typically a generalized form of a landscape. A profile generally uses interpolation to fill in the vague areas between tested data points, while allows a curve to be fitted to the data for a best-estimate approximation. The interpolated data may then be used to extrapolate the performance profile to larger systems. This way, the tests can be run on a small set hardware while still generating effective profiles for the largest systems. A profile model so configured may also be used to select a fastest solution when an application calls out to an API or function in a different computing environment from that within which the performance data was collected.

It will be appreciated that various modifications may be made to the illustrated embodiments without departing from the spirit and scope of the invention. For example, performance data may be used to identify additional performance enhancements and/or problems in a system. In addition, other code generation techniques may be utilized in the generation of selection program code. Moreover, any of the techniques described above as being utilized in connection with a code generation tool may be used in connection with an analysis tool, and vice versa. It will also be appreciated that the implementation of a code generation tool and an analysis tool to implement the herein described functionality would be well within the abilities of one of ordinary skill in the art having the benefit of the instant disclosure.

Other modifications will be apparent to one of ordinary skill in the art. Therefore, the invention lies in the claims hereinafter appended.

What is claimed is:

1. A method of optimizing operation of a parallel computer system of the type including a plurality of interconnected nodes, the method comprising:
   collecting performance data for a set of implementations of a function capable of being executed on the parallel computer system based upon the execution of the set of implementations under varying input parameters in a plurality of input dimensions;
   based upon and using the collected performance data, generating selection program code configured to call selected implementations of the function in response to a call to the function under varying input parameters; and
   analyzing the collected performance data to identify an optimum implementation from among the set of implementations of the function for each of a plurality of combinations of input parameters, wherein the generated selection program code is configured to select the identified optimum implementation of the function for at least one combination of input parameters.

2. The method of claim 1, wherein the function is defined in a library, the method further comprising inserting the generated selection program code in a source code representation of the library and compiling the library.

3. The method of claim 2, wherein collecting the performance data includes executing a test application to which the library is attached to test the set of implementations under varying input parameters.

4. The method of claim 1, wherein generating the selection program code includes sorting at least a subset of the implementations at a plurality of test points in a test space, wherein each test point is associated with a set of input parameters.

5. The method of claim 4, wherein generating the selection program code includes identifying at least one transition point among the plurality of test points, and generating selection program code that selects from among at least two implementations of the function based upon at least one input parameter associated with the transition point.

6. The method of claim 5, further comprising generating a multidimensional surface from the collected performance data, wherein identifying the transition point includes analyzing the multidimensional surface.

7. The method of claim 1, wherein the generated selection program code includes at least one hash table configured to select between the set of implementations of the function.

8. The method of claim 1, wherein the generated selection program code includes at least one switch statement configured to select between the set of implementations of the function.

9. The method of claim 1, wherein the generated selection program code includes at least one IF statement configured to select between the set of implementations of the function.

10. The method of claim 1, wherein the parallel computer system is a massively parallel computer system.

11. An apparatus, comprising:
    at least one processor; and
    program code configured to be executed by the at least one processor to optimize operation of a parallel computer system of the type including a plurality of interconnected nodes by collecting performance data for a set of implementations of a function capable of being executed on the parallel computer system based upon the execution of the set of implementations under varying input parameters in a plurality of input dimensions, and based upon and using the collected performance data, generating selection program code configured to call selected implementations of the function in response to a call to the function under varying input parameters, wherein the program code is further configured to analyze the collected performance data to identify an optimum implementation from among the set of implementations of the function for each of a plurality of combinations of input parameters, wherein the generated selection program code is configured to select the identified optimum implementation of the function for at least one combination of input parameters.

12. The apparatus of claim 11, wherein the function is defined in a library, wherein the program code is further configured to insert the generated selection program code in a source code representation of the library and compile the library.

13. The apparatus of claim 12, wherein the program code is configured to collect the performance data by executing a test application to which the library is attached to test the set of implementations under varying input parameters.

14. The apparatus of claim 11, wherein the program code is configured to generate the selection program code by sorting at least a subset of the implementations at a plurality of test points in a test space, wherein each test point is associated with a set of input parameters, identifying at least one transition point among the plurality of test points, and generating selection program code that selects from among at least two implementations of the function based upon at least one input parameter associated with the transition point.

15. The apparatus of claim 14, wherein the program code is further configured to generate a multidimensional surface from the collected performance data, wherein the program code is configured to identify the transition point by analyzing the multidimensional surface.

16. The apparatus of claim 11, wherein the parallel computer system is a massively parallel computer system.

17. A program product, comprising:
program code configured to optimize operation of a parallel computer system of the type including a plurality of interconnected nodes by collecting performance data for a set of implementations of a function capable of being executed on the parallel computer system based upon the execution of the set of implementations under varying input parameters in a plurality of input dimensions, and based upon and using the collected performance data, generating selection program code configured to call selected implementations of the function in response to a call to the function under varying input parameters, wherein the program code is further configured to analyze the collected performance data to identify an optimum implementation from among the set of implementations of the function for each of a plurality of combinations of input parameters, wherein the generated selection program code is configured to select the identified optimum implementation of the function for at least one combination of input parameters; and
a physical recordable computer readable medium bearing the program code.

18. A method of deploying a function in a parallel computer system of the type including a plurality of interconnected nodes, the method comprising:
for a function that includes a set of implementations capable of being executed on the parallel computer system, generating selection program code configured to call selected implementations of the function in response to a call to the function under varying input parameters, wherein generating the selection program code is based upon and uses performance data collected during execution of the set of implementations under varying input parameters in a plurality of input dimensions; and deploying the implementations of the function and selection program code to the parallel computer system;
wherein the method further comprises analyzing the collected performance data to identify an optimum implementation from among the set of implementations of the function for each of a plurality of combinations of input parameters, wherein the generated selection program code is configured to select the identified optimum implementation of the function for at least one combination of input parameters.

19. A method of optimizing operation of a parallel computer system of the type including a plurality of interconnected nodes, the method comprising:
collecting performance data for a set of implementations of a function capable of being executed on the parallel computer system based upon the execution of the set of implementations under varying input parameters in a plurality of input dimensions;
generating a multidimensional surface from the collected performance data;
identifying a plurality of transition points from the multidimensional surface;
analyzing the collected performance data to identify an optimum implementation from among the set of implementations of the function for each of a plurality of combinations of input parameters; and
generating selection program code configured to select the identified optimum implementation of the function for at least one combination of input parameters.

20. The method of claim 19, further comprising analyzing the collected performance data to check for regressions between drivers.

21. The method of claim 19, further comprising analyzing the collected performance data to identify an implementation that is not properly enabled.

22. The method of claim 19, further comprising analyzing the collected performance data to identify a set of input parameters resulting in sub-optimal performance.

23. The method of claim 19, further comprising generating a profile from the multidimensional surface, including extrapolating the performance data from the multidimensional surface in the profile.

* * * * *